June 27, 1967 G. L. GERSHMAN 3,327,399

DATUM LINE TAPER MICROMETER

Filed May 28, 1965

Inventor
George L. Gershman
By Charles P. Fay,
Attorney

United States Patent Office 3,327,399
Patented June 27, 1967

3,327,399
DATUM LINE TAPER MICROMETER
George L. Gershman, 100 Grove St.,
Worcester Mass. 01605
Filed May 28, 1965, Ser. No. 459,563
3 Claims. (Cl. 33—174)

This invention relates to a new and improved micrometer for measuring tapered objects, and the principal object of the invention resides in the provision of relatively simple, easily operated means for very accurately determining the exact diameter of the tapered object at a specific point from one of the ends thereof and including a U-shaped frame having a pair of arms thereon connected by a base, one of said arms being provided with a fixed chisel type anvil and oppositely thereto on the other arm there being provided a more or less conventional micrometer device having a non-rotating spindle with a corresponding chisel edge end, the tapered object to be measured being mounted on the fixed anvil and the diameter thereof being measured by the micrometer device at any position along the tapered surface thereof, together with the provision of an additional micrometer device adjustably mounted along the base for the U-shaped frame and being provided to form a base measuring point for the tapered object so that it is possible to take the accurate diametrical measurement of an object at an exact distance from the end of the tapered object.

Other objects and advantages of the invention will appear hereinafter.

Reference is to be had to the accompanying drawings, in which.

Figure 1:
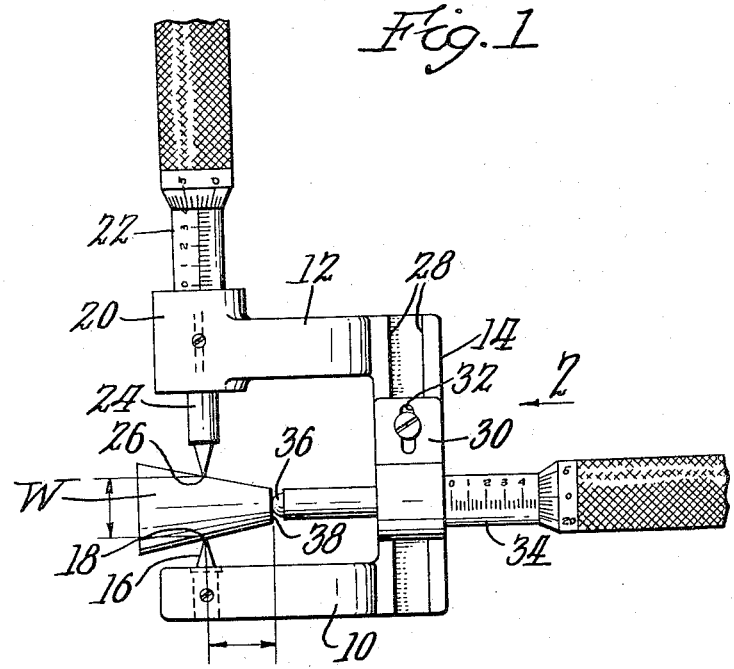
FIG. 1 is a plan view illustrating the invention.
Figure 3:
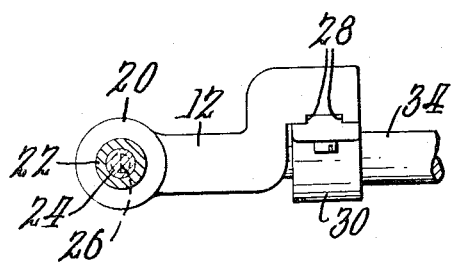
FIG. 3 is a top plan view thereof.
Figure 2:
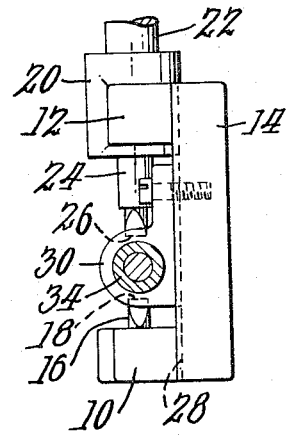
FIG. 2 is a view of the frame of the device, looking in the direction of arrow 2 in FIG. 1.

In carrying out the invention, there is provided a strong and rigid U-shaped frame which has a lower arm 10, an upper parallel arm 12 and a member 14 connecting the arms and holding the same in rigid relationship with respect to each other.

A fixed anvil 16 having a chisel edge 18 is mounted in arm 10, it being of course understood that anvils of different lengths may be utilized. The chisel edge 18 is transverse to the arm 10. In the upper arm 12 there is provided a boss 20 in which there is mounted a generally conventional micrometer measuring device 22 which however has a non-rotating spindle 24 having a chisel edge 26 parallel to that at 18. This micrometer measuring device measures the distance between the edge 18 of anvil 16 and the edge 26 of spindle 24 of the micrometer measuring device 22. The chisel edges of the anvil 16 and the spindle 24 are of course aligned and parallel.

The closed end portion 14 of the device is provided with machined ways 28 upon which a bracket 30 having a boss is slidably mounted, together with any kind of fastening means desired such as a slot 32 and a bolt, screw or the like in the slot for the purpose of holding the boss of the bracket 30 in desired position. In this boss there is provided another micrometer measuring device 34 which can be slid along the ways 28 to any position desired and which measures the distance between the center line of the chisel edges 16 and 26, to the end of the spindle of micrometer 34 as at 36. The spindle of the micrometer 34 can be either rotating or non-rotating.

The use of the device will be apparent from FIG. 1. The tapered piece of work W is placed on the edge of anvil 16 and the distance from the center line of the anvil to its end at 38 is determined by the micrometer measuring device 34, while the diameter is measured by the measuring device 22 at a certain specified distance from spindle 36 and thus the dimension desired is very accurately determined at a specific location from one end of the piece W.

Having thus described my invention and the advantages thereof, I do not wish to be limited to the details herein disclosed, otherwise than as set forth in the claims, but what I claim is:

1. A datum line micrometer for measuring tapered objects comprising a U-shaped member having a pair of parallel spaced arms and an element rigidly connecting said spaced arms, a fixed position anvil mounted in one arm facing the other arm, a non-rotating spindle micrometer measuring device mounted in the other arm in line with the anvil, a chisel edge on the spindle, said micrometer being capable of measuring the distance between the end of its non-rotating spindle and the anvil, and a second micrometer measuring device mounted in the member connecting the two arms, the second micrometer measuring device having a spindle normal to and extending toward the line between the anvil and the non-rotating spindle of the first-named micrometer measuring device, and being capable of measuring the distance from an end of a workpiece to the point at which the diameter thereof is measured by the non-rotating spindle micrometer.

2. The datum line taper micrometer recited in claim 1 including means for mounting the second micrometer measuring device for lateral motion along the member connecting the two arms, said second micrometer measuring device being movable in a direction parallel to the measuring motion of the non-rotating spindle of the first-named micrometer measuring device.

3. The datum line taper micrometer of claim 1 including parallel spaced chisel edges on the anvil and the end of the spindle of the first-named micrometer measuring device.

References Cited
UNITED STATES PATENTS

| 536,859 | 4/1895 | Ebert | 33—167 |
| 764,203 | 7/1904 | Perkins | 33—174 |
| 1,196,789 | 9/1916 | Koelpin | 33—174 |
| 2,541,821 | 2/1951 | Kneissler | 33—167 |

LEONARD FORMAN, *Primary Examiner.*

SAMUEL S. MATTHEWS, *Assistant Examiner.*